United States Patent [19]
Mattei et al.
[11] Patent Number: 4,633,891
[45] Date of Patent: Jan. 6, 1987

[54] PIERCING DEVICE FOR PIERCING VENTILATING HOLES IN CIGARETTES OR SIMILAR SMOKING COMMODITIES

[75] Inventors: Riccardo Mattei; Armando Neri, both of Bologna; Santo R. Gobbi, Pavia; Maichi Cantello, Torino, all of Italy

[73] Assignee: G.D. Societa per Azioni, Bologna, Italy

[21] Appl. No.: 649,225

[22] Filed: Sep. 10, 1984

[30] Foreign Application Priority Data

Sep. 12, 1983 [IT] Italy ................................ 3556 A/83

[51] Int. Cl.⁴ ................................................ A24C 5/60
[52] U.S. Cl. .................................................... 131/281
[58] Field of Search ........................................ 131/281

[56] References Cited

U.S. PATENT DOCUMENTS 4,524,785 6/1985 Seragnoli ............................ 131/281

*Primary Examiner*—V. Millin
*Attorney, Agent, or Firm*—Frost & Jacobs

[57] ABSTRACT

A piercing device for piercing holes in cigarettes or similar smoking commodities, in which a laser beam emitted by a continuous laser source is directed, by a mobile reflecting and focusing unit, mounted in a rotary manner around an axis a fixed reflecting member is arranged on the axis and the beam is reflected on to the cigarettes for piercing, while the latter turn round their own axis and travel crosswise in relation to the axis of the beam.

The mobile unit receives the laser beam in a direction coaxial with the axis and diverts it first outwards and then towards the latter. The focused beam is derived on to the cigarettes by a ring of mirrors with which the reflecting member is provided.

4 Claims, 2 Drawing Figures

PIERCING DEVICE FOR PIERCING VENTILATING HOLES IN CIGARETTES OR SIMILAR SMOKING COMMODITIES

BACKGROUND OF THE INVENTION

The present invention relates to a piercing device for piercing ventilating holes in cigarettes or similar smoking commodities.

For making so-called "ventilated" cigarettes, piercing devices are known to be employed on which the piercing "tool" consists of a laser source. On known types of laser beam piercing devices, cigarettes are generally pierced according to two techniques, the first technique uses a laser source which pierces the ventilating holes in the cigarettes as they turn round their own axis, and the second technique uses mobile reflecting systems designed to divert the laser beam on to the cigarettes being pierced in different directions, while the cigarette travels in relation to the source without turning round its own axis.

In both the above cases, known types of laser beam devices use a "pulsating" laser source, the frequency of which is sufficient to pierce a hole for each pulse.

The employment of a pulsating laser source, however, makes it practically impossible for the above known types of piercing devices to be used in conjunction with high-output cigarette manufacturing or filter assembly machines designed for producing as many as 10,000 cigarettes a minute.

For this to be done, the pulse frequency required for piercing about thirty holes in each cigarette is around 5,000 Hz, which means using relatively large, high-power laser sources. Furthermore, such pulse frequencies usually result in irregular, drawn-out holes of unacceptable appearance.

SUMMARY OF THE INVENTION

The aim of the present invention is to provide a laser beam piercing device designed to operate smoothly in conjunction with high-output cigarette manufacturing and filter assembly machines and which involves none of the abovementioned drawbacks.

With this aim in view, the present invention relates to a piercing device for piercing ventilating holes in cigarettes or similar smoking commodities supported on a feeding drum, turning round its own first axis, and designed to turn round their own second axis in relation to the drum. The piercing device comprises a laser source and an optical reflecting and focusing system designed to divert the beam emitted by the source and focus it on specific points on the surface of each cigarette or smoking commodities the device is characterised by the fact that the source is designed to emit a continuous laser beam along the first axis and that the said optical system comprises a mobile unit, turning round the first axis and designed to divert the said beam towards the first axis, and a fixed reflecting member provided with a ring of mirrors arranged round the first axis and designed to intercept, in succession, the beam and divert it outwards on to the said cigarettes or smoking commidity.

BRIEF DESCRIPTION OF THE DRAWINGS

Further characteristics and advantages of the present invention will now be described with reference to the attached drawings showing a non-limiting example and in which.

DETAILED DESCRIPTION OF THE INVENTION

Figure 1:
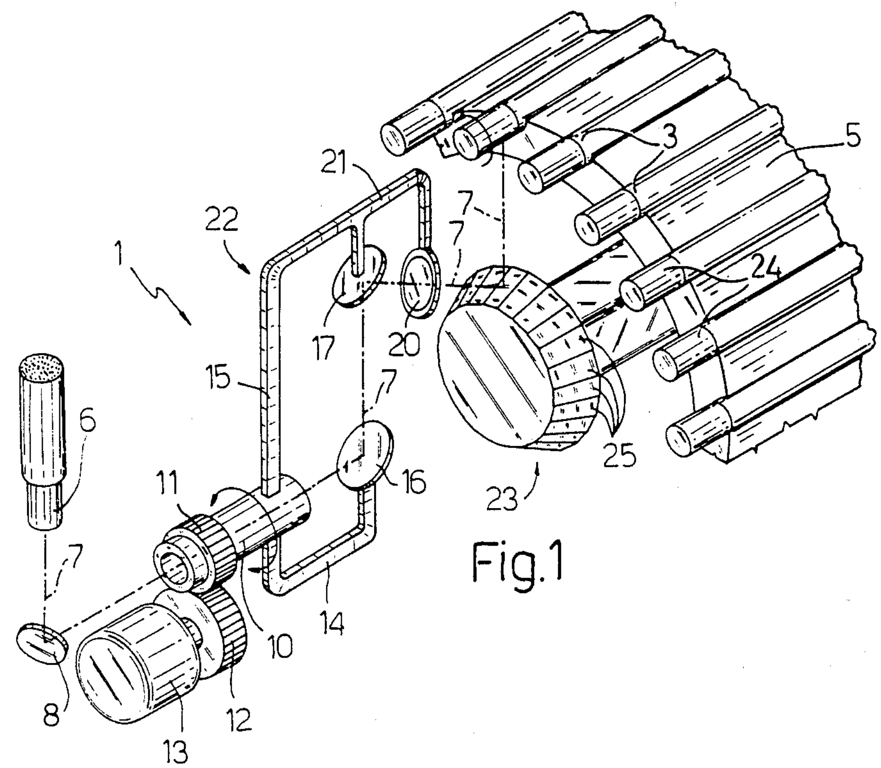
FIG. 1 shows a perspective view of a preferred arrangement of the piercing device according to the present invention.

Number 1 in FIG. 1 indicates a piercing device designed to pierce a ring of holes 2 (FIG. 2) in a number of cigarettes 3. Each of the latter is partially housed inside a seat 4 on the periphery of feeding drum 5 designed to turn round its own axis at a given constant speed. Device 1 comprises a continuous laser source 6 designed to emit a beam 7 diverted by a fixed mirror 8 along an axis 9 coinciding with the axis of rotation of drum 5.

Device 1 also comprises a tubular body 10 mounted so as to turn around its own axis coinciding with axis 9. Tubular body 10 is provided with an outer ring 11 engaging with an output pinion 12 on motor 13 designed to drive body 10 at a given constant speed.

From the end of body 10 facing drum 5 extend two arms, 14 and 15, supporting respective mirrors, 16 and 17, the former of which is designed to intercept the beam 7 from body 10 and divert it outwards on to mirror 17 in a direction essentially perpendicular to axis 9.

Figure 2:
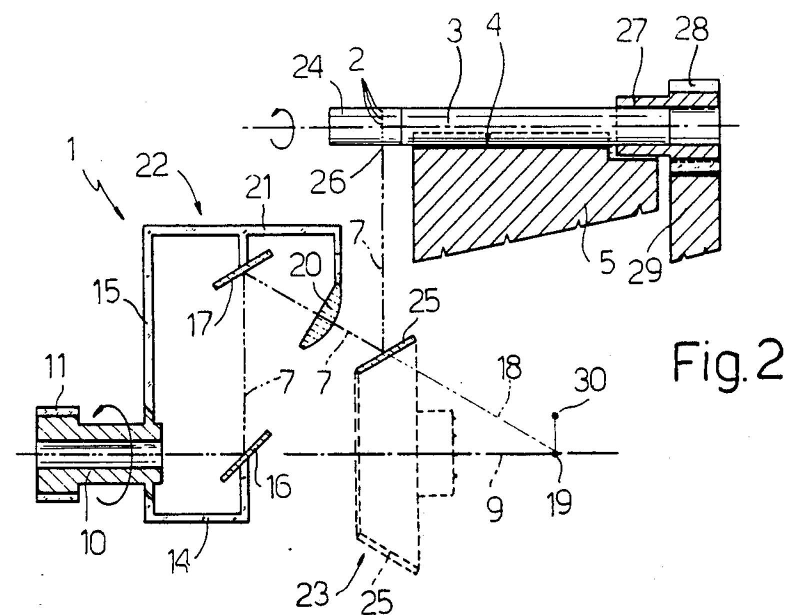
FIG. 2 shows a cross-sectional side view of the FIG. 1 device.

As shown in FIG. 2, mirror 17 is positioned so as to divert beam 7 along axis 18 intersecting axis 9 at point 19. Axis 18 coincides with the optical axis of focusing lens 20 supported on arm 21 integral with arm 15, the lens being designed to focus beam 7 on a point which, if the focused beam was not diverted further, would coincide with point 19, regardless of the angular position assumed round axis 9 by mobile unit 22 comprising tubular body 10, arms 14, 15 and 21, mirrors 16 and 17 and lens 20.

Device 1 also comprises a fixed reflecting member 23 having the shape of a regular truncated pyramid and arranged coaxial with axis 9 with its tip facing tubular body 10. Reflecting member 23 has n number of faces, equal to the number of holes to be pierced in filter 24 of each cigarette 3 projecting from drum 5. Each face on reflecting member 23 is provided with a reflecting surface or mirror 25 which, for a given set of angular positions assumed by mobile unit 22, intercepts the focused beam 7 from lens 20 and reflects it outwards in an essentially radial direction until a reflected focus 26 is formed on the surface of cigarettes 3.

The end opposite filter 24 on each cigarette 3 is fitted inside a holder 27 arranged axially in relation to seat 4 and connected to a gear 28. Each gear 28 meshes with a ring 29 designed to turn in relation to drum 5, in such a manner as to turn cigarettes 3 round their own axis as they are carried forward by drum 5.

During operation, the relationship between the speeds of drum 5 and tubular body 10 is generally such that a complete turn of mobile unit 22 round its own axis is accompanied by one step forward of cigarettes 3 amounting to the distance between two adjacent cigarettes 3. Furthermore, if n is the number of holes 2 to be pierced in each cigarette 3, and each cigarette is pierced as it is fed forward on drum 5 over a piercing arc of n steps in length, each cigarette 3 is caused to make a complete turn round its own axis by drive 27, 28 and 29. Following the same assumption, reflecting member 23 is provided with n mirrors 25 arranged round an arc the angle of which at the centre coincides with the angle at the centre of the said piercing arc.

Assuming the above operating mode, for each complete turn of mobile unit 22 round its own axis, piercing device 1 pierces a hole 2 in each cigarette 3 on the piercing arc, so that each cigarette 3 coming off the piercing arc is pierced with a ring of n holes 2 evenly distributed round the circumference of its filter 24.

For a better understanding of how piercing device 1 operates, it should be pointed out that, according to a known law of physics, if a beam of light is focused by a focusing device on one point which remains stationary in space regardless of the movement of the focusing device along any trajectory, any deflection of the focused beam of light will result in the creation of a new focus which, like the original focus, will remain stationary in space alongside a change in the position of the focusing device. Now, examining device 1 in light of this principle and considering that, without mirrors 25, beam 7 is always focused on fixed point 19, it follows that, by inserting a mirror 25, beam 7 is focused on point 26 which remains stationary in space for as long as it takes beam 7 to sweep the mirror 25, and which switches suddenly to a new fixed point 26 on the surface of an adjacent cigarette 3 when beam 7 begins to sweep a new mirror 25. Consequently, beam 7 is "pulsated" by mirrors 25 the effect of which is to localize in cycles the focus of beam 7 on n points distributed in fixed positions in relation to one another around the piercing arc.

At each of these points, device 1 pierces a hole 2 on the surface of the cigarette 3 coinciding at that time with the position of the point.

As each cigarette moves through all the points as it is carried over the piercing arc, a total number of n holes 2 will be pierced in it by the time it reaches the end of the piercing arc.

Furthermore, as each cigarette 3, in travelling over the piercing arc, makes a complete turn round its own axis at constant speed, holes 2 will be evenly distributed round the cigarette 3.

When struck by focused beam 7, cigarettes 3 continue moving of drum 5 so that holes 2 are usually oval in shape. To overcome this drawback and ensures that the focus of beam 7 moves along with each cigarette 3 for as long as each hole 2 is being pierced, the angle of mirror 17 and the focal axis of lens 20 is modified so as to define, in the absence of mirrors 25, a focus 30 at a given distance from axis 9.

Following rotation of mobile unit 22, focus 30 does not remain stationary in space like focus 19, but turns round a circumference having its centre on axis 9. Similarly, reflected focus 26 also moves in space and, while focused beam 7 is sweeping any one of mirrors 25, describes an arc at a speed essentially proportional to the radius of the circumference round which focus 30 moves.

Therefore, by calculating this radius, it is possible, for each mirror 25, to cause reflected focus 26 to move along with cigarette 3 for as long as it is being pierced, thus providing for perfectly round holes 2.

We claim:

1. A piercing device for piercing ventilating holes in the surface of cigarettes, the device comprising a feeding drum mounting for rotation about a first axis coinciding with the longitudinal axis of said feeding drum, said feeding drum being configured to support a row of equally spaced cigarettes with their longitudinal axes extending parallel to said first axis; rotary means carried by said feeding drum to rotate each cigarette relative to said drum about a second axis parallel to said first axis and coinciding with the longitudinal axis of each cigarette; a laser source for emitting a laser beam in a continuous manner along said first axis; and an optical reflecting and focusing system to divert and focus said beam in succession on predetermined points on the surface of each cigarette; said optical system comprising a mobile focusing unit mounted for rotation about said first axis to divert said beam away from and then toward said first axis, and a fixed reflecting member comprising a plurality of reflective surfaces arranged about said first axis and positioned to intercept said beam as it is diverted toward said firs axis by said mobile focusing unit, said reflecting surfaces diverting said beam outwardly onto said rotating cigarettes.

2. A device as claimed in claim 1, wherein said mobile focusing unit comprises two mirrors, the first of which is arranged on said first axis to divert said beam outwards to impinge onto the second of said two mirrors, said second mirror being arranged so as to divert said impinging laser beam toward said first axis; and a focusing lens for said beam mounted on said mobile focusing unit.

3. A device as claimed in claim 2, wherein said lens is arranged between said second mirror and said reflecting member.

4. A device as claimed in claim 2, wherein said second mirror and said lens are positioned so as to define, in the absence of said reflecting member, a focal point lying at a predetermined distance from said first axis and rotating about said first axis together with said mobile unit.

* * * * *